Dec. 31, 1940.   E. V. COLLINS   2,227,124
DAMMING DEVICE
Filed Feb. 24, 1937   3 Sheets-Sheet 3

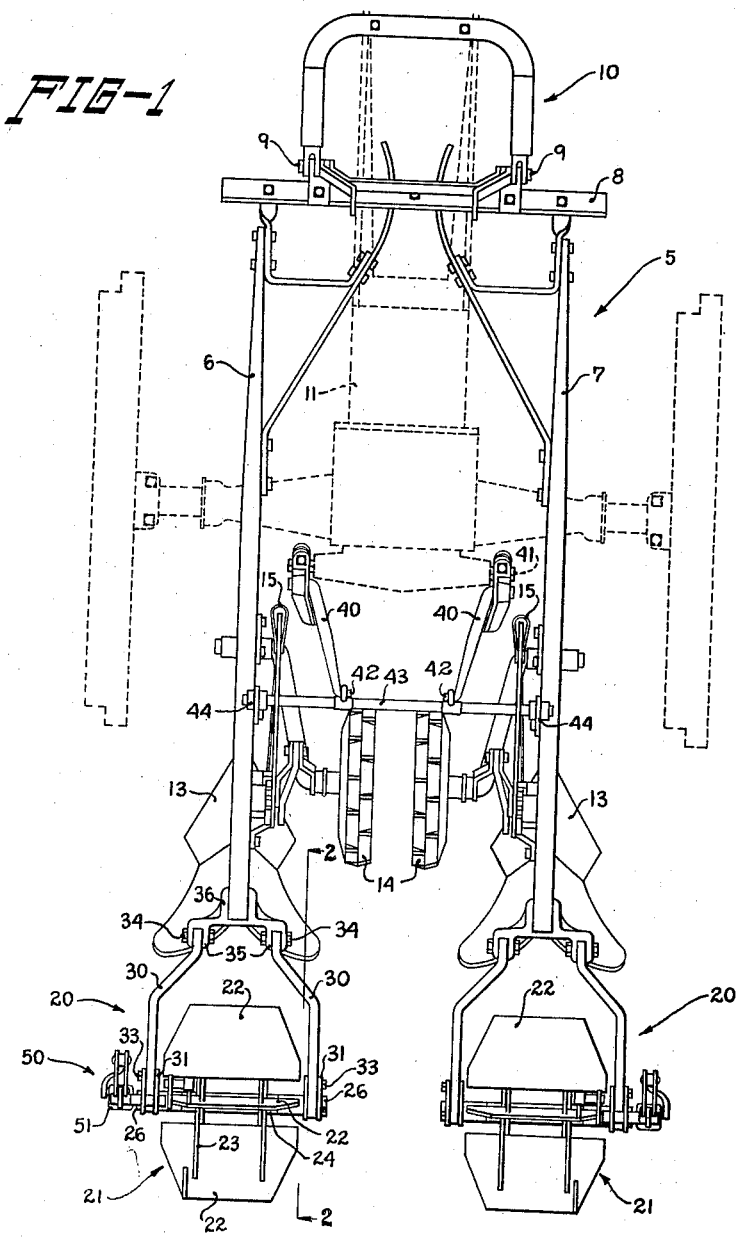

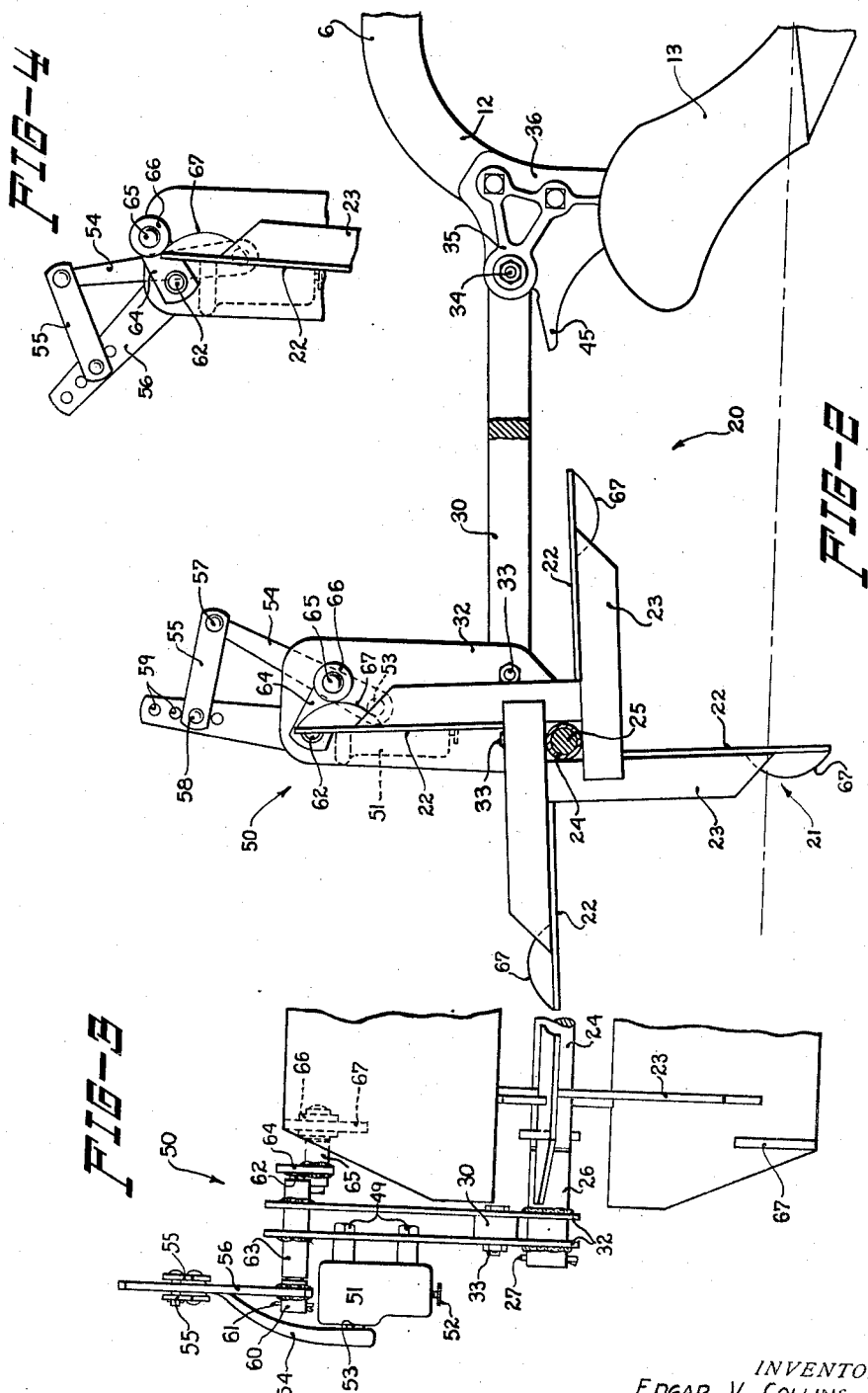

INVENTOR:
EDGAR V. COLLINS
BY
ATTORNEYS.

Patented Dec. 31, 1940

2,227,124

UNITED STATES PATENT OFFICE 2,227,124

DAMMING DEVICE

Edgar V. Collins, Ames, Iowa, assignor to Deere & Company, Moline, Ill., a corporation of Illinois Application February 24, 1937, Serial No. 127,346

20 Claims. (Cl. 97—55)

The present invention relates to damming devices of the farm implement type used for forming a field into a plurality of basins or pockets for the purpose of retaining and conserving moisture thereon, consisting generally of a furrow forming implement such as a lister, and scraper blades disposed behind each of the furrow forming tools on the implement for accumulating earth from the sides of the furrows, and depositing the same at intervals to form dams across the furrows. Such an implement is disclosed in a prior patent, No. 2,029,680, granted February 4, 1936, to Mr. C. K. Shedd and the present inventor, jointly.

Heretofore, damming implements of this type have been constructed in units comprising two or more laterally spaced damming scrapers adapted to operate with a lister or other implement of a like number of tools, and having a common control mechanism for periodically releasing the several scraper blades to cause them to deposit the accumulated earth in the furrow. Such implements are inflexible in that each damming device can be advantageously used only with furrow forming implements having the same number of earth engaging tools. An object of this invention therefore, is concerned with the provision of a self contained, unitary damming device that can be used in conjunction with a single furrow forming tool, and can be combined with other similar units to accommodate furrow forming implements of any number of tools, one damming unit being associated with each of the tools, respectively, and entirely independent of each other.

In this connection, another object of my invention has to do with the provision of independent, self contained tripping or control mechanism for each of the damming units whereby interconnection between the units is made unnecessary.

Heretofore, it has been customary to deposit dams at equally spaced intervals as controlled by mechanism actuated from some member, the speed of which is proportional to the speed of forward travel of the implement. The result of this type of control is that in certain soil conditions, insufficient dirt is accumulated in the given interval to form a dam of adequate height, while in other soil conditions, too much dirt is collected and the dams are much larger than necessary. A further object of this invention, therefore, relates to the provision of a control mechanism which releases the scraper blade for depositing a dam after sufficient earth has been collected to form an adequate dam.

In order to prevent dams from being placed at too frequent intervals in soft ground, another object is to provide time delay control means for insuring that there is adequate spacing between dams even though the scraper can collect sufficient earth to form dams at closer intervals.

These and other objects will be made apparent from a consideration of the following description of an embodiment of my invention, reference being had to the drawings appended hereto, in which Figure 1 is a plan view of a two bottom tractor mounted lister, each bottom being provided with a unitary damming device embodying the principles of my invention;

Figure 2 is a side elevation of the rear end of the lister, showing the damming device drawn to a large scale;

Figure 3 is a partial rear elevation of the damming device showing the details of the control mechanism;

Figure 4 is a fragmentary view, in side elevation, showing the control mechanism in the position just before the blade is released.

Figure 5:
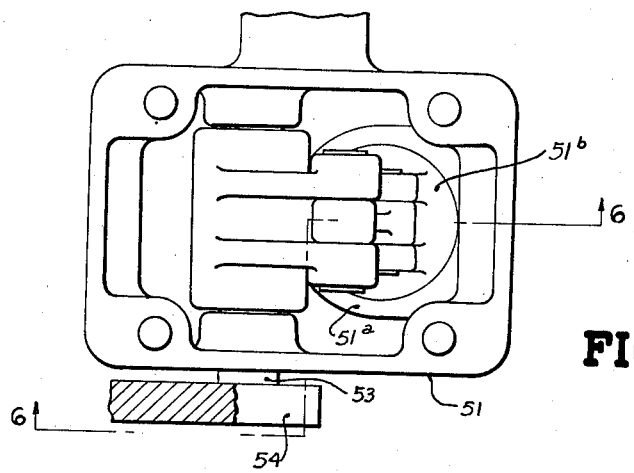
Figure 5 is a plan view, partly in section, of the dash pot which forms a part of the controlling member of the rotatable scraper assembly, the cover plate thereof being removed.
Figure 6:
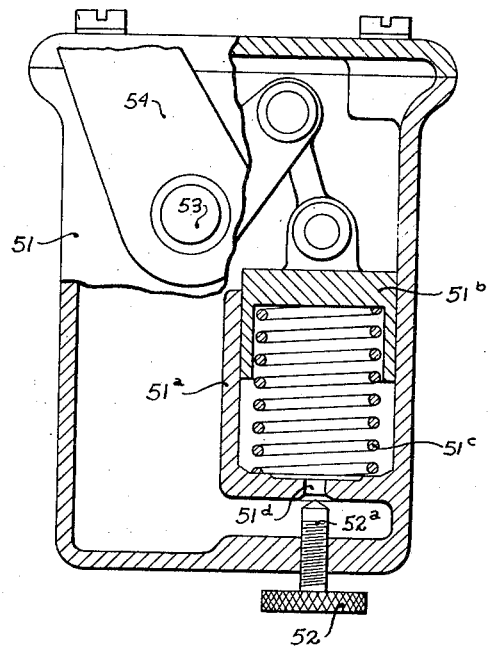
Figure 6 is a view, partly in side elevation and partly in vertical section, of the dash pot shown in Figure 5.

Referring now to the drawings, the lister, generally indicated by the reference numeral 5, shown and described in detail in an application, Serial No. 747,261, filed October 8, 1934, by Walter H. Silver (Patent No. 2,130,512, issued September 20, 1938), comprises a pair of longitudinally extending draft beams 6, 7, connected at their forward ends to a transverse frame member 8, which is pivotally connected at 9 to a member 10 bolted to the tractor 11, the latter being indicated by dotted lines. Each of the beams 6, 7 has a downwardly extending shank 12 at the rear thereof, to which is fixed a lister bottom 13, the depth of operation of which is controlled by individual gauge wheels 14, which are separately adjustable by means of levers 15.

Disposed directly behind each of the furrow forming bottoms 13 is a unitary damming device indicated in its entirety by the reference numeral 20, comprising a rotatable scraper assembly 21 which includes a plurality of scraper blades 22 (four, in the embodiment shown), extending radially outwardly from a transverse axis of rotation. Each of the blades 22 is tapered to conform to the sides of the furrow and is supported on a pair of spaced arms 23, which are fixed, as by welding, to an axially disposed pipe or hollow shaft 24 which is journaled on an axle 25. The axle 25 extends laterally beyond the ends of the pipe 24 to receive sleeves 26 at each end, respectively, best illustrated in Figure 3. These sleeves are fixed to the axle by pins 27, inserted through diametrically aligned holes in the axle and sleeve.

A pair of forwardly extending draft beams 30 are connected to the sleeves 26 by means of brackets 31, each bracket consisting of a pair of axially spaced plates 32 having apertures adapted to receive the sleeves, the plates being welded to the sleeves. Each beam 30 is fixed between the two plates 32 of one of the brackets 31 by bolts 33. The beams converge forwardly and are each pivotally connected to the lister shank 12 by means of transversely aligned bolts 34 supported in laterally spaced ears 35 on a bracket 36, bolted to the shank 12.

Thus each of the rotary scraper assemblies 21 is disposed to operate in the furrow formed by its respective lister bottom 13, and by virtue of its pivotal connection therewith it is free to swing vertically with respect to the lister bottom, hence the depth of operation of the camming blades is determined by the weight of the device and the character of the soil in which it is operating.

The lister is raised out of earth engaging position, by the power lift mechanism of the tractor, acting through a pair of lifting arms 40, connected to the actuating rock shaft 41 of the mechanism, and lifting connections 42 connecting the arms 40 to a transverse bar 43 which is mounted in brackets 44 on the beams 6, 7. As the tool beams 6, 7 are raised, the draft beams 30 of the damming devices 20 are engaged by a rearwardly projecting lug 45 on each of the brackets 36, thereby raising the damming devices with the lister.

Referring now more particularly to Figures 2 and 3, the rotatable scraper assembly 21 is held with one of the blades 22 in earth engaging position by means of detent mechanism, indicated generally by the reference numeral 50, the controlling member of which comprises a spring backed dash pot 51, mounted on one of the plates 32 of one of the brackets 31 and secured by bolts 49. Since this piece of equipment is of any suitable type, well known to those skilled in the art, and since the details of this mechanism form no part of the present invention, a detailed description of the dash pot is considered unnecessary. It is deemed sufficient to explain that the dash pot mechanism, in the form illustrated, comprises a hydraulic or pneumatic cylinder 51a within which operates a piston 51b, which is urged toward one end thereof by a spring 51c. Movement of the piston against the action of the spring is resisted by a fluid, such as air or liquid within the cylinder, the fluid being allowed to flow through a restricted aperture 51d to relieve the pressure, allowing retarded movement of the piston. The rate of flow of the fluid through the aperture is controlled by a valve 52a which is adjustable by means of a thumb screw 52. The piston is operatively connected to a rock shaft 53, to which is fixed an arm 54. This arm is connected through a pair of links 55 to a lever 56, the links 55 being disposed on opposite sides of the arm 54 and lever 56 and fastened thereto by pivot bolts 57, 58, respectively. The link 55 can be selectively connected at any of several points on the lever 56 by inserting the bolt 58 through any of several perforations 59 in the lever, thus varying the angle of movement of the lever responsive to a given angular movement of the dash pot arm 54, thus varying the mechanical advantage of the mechanism.

The lever 56 is welded on a sleeve 60, which fits over the end of a shaft 62 and is fixed thereto by a pin 61. The shaft 62 is journaled in a pipe 63, which is supported in the upwardly extended ends of the plates 32 of one of the brackets 31, and fixed thereto, as by welding. Welded to the opposite end of the shaft 62 is a crank arm 64 carrying a bolt 65 on which is journaled a detent roller 66. The roller bears upon a cam 67 which is welded or otherwise fixed to the back of the scraper blade 22, there being a cam fixed to each of the four blades and disposed to engage the detent roller successively.

The operation of the damming device is as follows:

The rotatable assembly 21 follows the lister bottom 13 in the furrow formed by the latter, and accumulates loose dirt from the sides of the furrow. During forward movement of the implement, the tendency for the rotatable assembly to roll along the ground is resisted by the spring-backed dash pot 51, acting through the cranks and link connections upon the detent roller 65, which engages the cam 67 to prevent rotation of the scraper assembly. As dirt accumulates in front of the earth engaging blade, the pressure against the blade increases, thereby increasing the pressure of the cam 67 against the roller 66, effecting a counterclockwise movement of the crank arm 64, axle 62, lever 56, and arm 54, thus acting against the spring in the dash pot mechanism, causing it to yield proportionately until the roller disengages the end of the blade, allowing the rotatable assembly to rotate. Rotation of the blade assembly deposits the accumulated earth in the furrow to form a dam across the furrow. When the blade moves away from the detent, the pressure against the spring is relieved, and the spring forces the linkage back into normal position with the detent roller once more in register with the blades, whereby the rotation of the assembly is arrested when the succeeding blade comes into engagement with the detent.

It is now evident that the above described mechanism provides self-contained control means on each individual damming device for controlling the movement of the detent from its normal position engaging the rotatable assembly to a disengaged position in which the assembly is free to rotate when a sufficient amount of earth has been collected to form a dam.

The inertia of the rotatable assembly might cause the detent to be immediately tripped when the succeeding blade strikes it if it were not for the action of the dash pot, which delays the movement of the detent mechanism, thus insuring proper operation. Furthermore, the mechanism is delayed in its operation in case the earth is loose and heavy, which would otherwise result in the dams being placed too close together. Adjustment of the dash pot to vary the retarding action thereof is effected by means of the adjusting screw 52.

The purpose of the camming member 67 is to insure that a uniform rate of increase of pressure of the blade 22 against the detent roller causes a uniform angular movement of the detent member in moving out of engagement with the blade. It is evident from the drawings that if the roller engaged the blade 22 directly, there would be a point where the blade would be disposed perpendicular to the crank arm 64, locking the blade against further movement regardless of the amount of pressure against it. This is avoided by making the cam 67 of such shape that the angle between the crank arm 64 and a line tangent to the camming surface at the point of contact with the detent roller remains substantially constant throughout the range of movement of the detent roller.

I do not intend my invention to be limited to the exact details shown and described herein except as set forth in the following claims.

I claim:

1. An implement comprising a frame, a ground working tool carried thereby, and a damming device including a rotatable scraper assembly comprising a plurality of earth collecting blades extending substantially radially from the axis of rotation, a draft beam therefor, means for pivotally connecting said draft beam to said frame for transmitting draft to said scraper, and control mechanism mounted solely on said device and responsive to the collection of a sufficient amount of earth by said blade to form a dam, for alternately detaining and releasing said rotatable scraper with respect to rotation on said axis during forward movement of the implement.

2. In a damming device of the class described, draft means and an earth engaging blade adapted to accumulate dirt from the sides of a furrow and being movable relative to said draft means to deposit such accumulated earth to form a dam, disengageable detent means for holding said blade in earth engaging position, means responsive to the amount of dirt accumulated by said blade, for disengaging said detent means, and means for delaying the action of said disengaging means.

3. In a damming device of the class described, a rotatable assembly of radially extending scraper blades adapted to engage the ground successively for accumulating soil and to rotate to deposit such accumulated soil to form a dam, a detent device comprising a detent for restraining said rotatable assembly against rotation during forward movement of the damming device and means responsive to the pressure exerted by the rotatable assembly against said detent incidental to the reaction of the blade against said accumulated soil, for disabling the latter to permit rotation of said rotatable assembly.

4. In a damming device of the class adapted to be drawn in a furrow for accumulating soil from the sides thereof and depositing said soil at intervals to form dams, a scraper blade movable between operative and inoperative positions, a detent disposed to restrain said blade from moving out of said operative position, and means responsive to the pressure of accumulated soil against said scraper blade for disabling said detent, and thereby allowing the blade to move into said inoperative position.

5. In a damming device of the class adapted to be drawn in a furrow for accumulating soil from the sides thereof and depositing said soil at intervals to form dams, a scraper blade movable between operative and inoperative positions, a detent disposed to restrain said blade from moving out of said operative position, means responsive to the pressure of accumulated soil against said scraper blade for disabling said detent, and thereby allowing the blade to move into said inoperative position, and means for delaying said disabling means.

6. In a damming device of the class described including a scraper blade movable between earth engaging and inoperative positions, means responsive to pressure of earth against said blade for controlling the movement of said blade, said means comprising a spring-backed dash pot and detent means connected thereto.

7. In a damming device of the class described, a rotary scraper assembly comprising earth engaging blades extending radially from the axis of rotation of said assembly, a detent member disposed in engagement with said assembly and movable out of engagement therewith by a force exerted against said detent member through said rotary assembly, and a spring-backed dash pot connected to said detent member for resisting movement of the latter out of said position of engagement.

8. In a damming device of the class described, a rotary scraper assembly comprising earth engaging blades extending radially from the axis of rotation of said assembly, a detent member disposed in engagement with said assembly and movable out of engagement therewith by a force exerted against said detent member through said rotary assembly, and a spring-backed dash pot connected to said detent member for resisting movement of the latter out of said position of engagement, said dash pot having means for adjusting the rate of said movement of said detent.

9. In a damming device of the class described including a scraper blade member disposed in earth engaging position and rotatable out of said position by pressure of accumulated earth against said blade member as the latter is moved forwardly, a detent member, a support therefor, means on said blade member serving as a cam disposed in engagement with said detent member, the latter being movable out of engagement with said camming means, resilient means for yieldingly holding said detent member in engagement with said camming means and adapted to yield to movement of said blade member occasioned by said pressure of accumulated earth, said camming means being adapted to cooperate with said detent means whereby uniform increase of pressure of said blade member against said detent member causes substantially uniform movement of said detent member in moving out of engagement with said camming means.

10. In a damming device of the class described including a rotatable scraper assembly comprising a plurality of radially extending blades disposed about a transverse axis, said blades being adapted to engage the sides of a furrow, one at a time, to accumulate earth and being rotatable by pressure of the accumulated earth for depositing the latter in the furrow, a crank arm, a pivotal support therefor, a detent roller journaled on said arm, means providing a camming surface on each of said blades for engaging said detent roller, means engaging said crank arm for resiliently holding said detent roller in engagement with said camming surface, but adapted to yield to pressure of said blade thereagainst, thereby allowing said crank arm to be pivoted until the roller disengages the camming surface, the latter being of such shape that the angle between said crank arm and a line tangent to said camming surface at the point of contact with said detent roller is substantially constant.

11. In a device of the class described including draft means and a scraping tool movable relative thereto into and out of earth-engaging position incident to forward travel thereof, mechanical means responsive to the collection of a sufficient quantity of earth by said tool to form a dam for controlling the movement of the tool out of earth-engaging position.

12. In a device for collecting earth including draft means and a scraping tool movable relative thereto into and out of earth-engaging position incident to forward travel thereof, means responsive to the collection of a sufficient quantity of earth by said tool to form a dam for controlling the movement of the tool out of earth-engaging position, said controlling means being adjustable to operate selectively responsive to various quantities of collected earth.

13. A damming device comprising in combination a draft member, a transversely extending shaft carried thereby, an assembly of radially extending earth-collecting blades rotatably mounted on said shaft, detent means for preventing rotation of said assembly as the latter is moved with one of said blades in earth-engaging relation, and means responsive to the collection of a sufficient amount of earth to form a dam, for disabling said detent means thereby allowing said assembly to rotate whereby the collected earth is deposited as a dam.

14. In a damming device including draft means and an earth-collecting tool movable relative thereto into and out of operating position, means for restraining said tool against movement out of operating position, said restraining means adapted to be overcome by the resistance of the collected earth against said tool during forward movement of said device.

15. In a damming device comprising a rotatable scraper having a plurality of radially extending earth collecting blades and draft means therefor, yieldable means for restraining said scraper against rotation, said restraining means adapted to yield to a predetermined force against the blades caused by the resistance of a certain amount of earth collected by the blades during forward movement of said device.

16. In a device of the class described, draft means, an earth accumulating tool supported on said draft means and movable relative thereto into and out of earth accumulating position, responsive to advance of said tool, disengageable means for holding said tool in said earth accumulating position, said holding means being movable to disengaged position responsive to the accumulation of a sufficient amount of earth to form a dam as the tool advances.

17. In combination with an implement including a furrow forming element, a frame supported from the implement, a scraper pivotally mounted in the frame to be carried thereby in the furrow formed by the implement, means normally effective to lock the scraper in operative position but releasable by action of the accumulation of soil in the furrow ahead of the scraper to release the scraper, in a movement about its axis and then retain it in locked position.

18. In combination, a draft device, an earth-collecting tool journaled on said device for unidirectional rotation relative thereto and adapted to be rotated successively into and out of earth-collecting position by rolling contact with the ground, and control means movable between the tool retaining position and tool releasing position through the medium of the earth being collected by said tool incident to forward movement of the latter, for intermittently holding said tool in earth-collecting position and releasing it to deposit the collected earth, whereby spaced dams are formed.

19. An implement for forming dams in furrows, comprising draft means, an earth accumulating tool drawn thereby and adapted to operate to pile up loose earth in a furrow ahead of the tool to serve as a transverse dam, and means for holding said tool temporarily in operating position until a sufficient quantity of earth to form a dam has been accumulated by it, said holding means being disabled by engagement of part of the implement with the earth piled up in the furrow ahead of the tool, to release the tool for idle movement with respect to said pile of earth, to leave it as a dam in the furrow as the implement proceeds.

20. An implement for forming dams in furrows, comprising draft means, a rotary earth accumulating tool drawn thereby, having a blade adapted to operate to pile up loose earth in a furrow ahead of said blade, to serve as a transverse dam, and means for holding said tool temporarily against rotation with said blade in operating position, said holding means being disabled by engagement of part of the implement with earth piled up in the furrow ahead of the blade, to release the tool for idle rotation with respect to said pile of earth, to leave it as a dam in the furrow as the implement proceeds, said holding means acting automatically thereafter to again hold said tool temporarily against rotation with said blade in operating position at a point ahead of said dam.

EDGAR V. COLLINS.